US007685567B2

(12) United States Patent
Meijer et al.

(10) Patent No.: US 7,685,567 B2
(45) Date of Patent: Mar. 23, 2010

(54) ARCHITECTURE THAT EXTENDS TYPES USING EXTENSION METHODS

(75) Inventors: Henricus Johannes Maria Meijer, Mercer Island, WA (US); Anders Hejlsberg, Seattle, WA (US); Matthew J. Warren, Redmond, WA (US); Luca Bolognese, Redmond, WA (US); Peter A. Hallam, Seattle, WA (US); Gary S. Katzenberger, Woodinville, WA (US); Dinesh C. Kulkarni, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1271 days.

(21) Appl. No.: 11/192,919

(22) Filed: Jul. 29, 2005

(65) Prior Publication Data

US 2007/0028209 A1 Feb. 1, 2007

(51) Int. Cl.
*G06F 9/44* (2006.01)
(52) U.S. Cl. ..................................... 717/116
(58) Field of Classification Search ....................... None
See application file for complete search history.

(56) References Cited

U.S. PATENT DOCUMENTS

| 6,690,981 | B1 | 2/2004 | Kawachi et al. |
|---|---|---|---|
| 6,857,118 | B2 | 2/2005 | Karr et al. |
| 6,993,529 | B1 | 1/2006 | Basko et al. |
| 7,171,657 | B2 * | 1/2007 | Bloch et al. ................. 717/152 |
| 7,185,016 | B1 | 2/2007 | Rasmussen |
| 2004/0098384 | A1 | 5/2004 | Min et al. |
| 2004/0148592 | A1 | 7/2004 | Vion-Dury |
| 2004/0210828 | A1 | 10/2004 | Langer |
| 2004/0230584 | A1 | 11/2004 | Nouri |
| 2004/0243921 | A1 | 12/2004 | Carr et al. |
| 2004/0260691 | A1 | 12/2004 | Desai et al. |
| 2005/0027681 | A1 | 2/2005 | Bernstein et al. |
| 2005/0055336 | A1 | 3/2005 | Hui et al. |
| 2005/0138073 | A1 | 6/2005 | Zhou et al. |
| 2006/0048114 | A1 * | 3/2006 | Schmidt ..................... 717/148 |
| 2006/0179068 | A1 | 8/2006 | Warner et al. |
| 2006/0200438 | A1 | 9/2006 | Schloming |

(Continued)

OTHER PUBLICATIONS

Matthias Zenger, Martin Odersky, "Independently Extensible Solutions to the Expression Problem", Jan. 15, 2005, POOL 2005, ACM.*

(Continued)

*Primary Examiner*—Philip Wang
(74) *Attorney, Agent, or Firm*—Workman Nydegger

(57) ABSTRACT

Architecture that extends existing types including constructed and sealed types using extension methods. Extension methods are static methods that can be invoked using instance method syntax. Extension methods are declared by specifying the keyword "this" as a modifier on the first parameter of the methods. Extension methods have all the capabilities of regular static methods. In addition, once imported, extension methods can be invoked using instance method syntax. Also disclosed are rules for importing extension methods, and extension method invocations. Extension methods are imported through using-namespace-directives. In addition to importing the types contained in a namespace, a using-namespace-directive imports all extension methods in all static classes in the namespace. In effect, imported extension methods appear as additional methods on the types that are given by their first parameter and have lower precedence than regular instance methods.

17 Claims, 10 Drawing Sheets

U.S. PATENT DOCUMENTS

2007/0067716 A1  3/2007  Jung et al.

OTHER PUBLICATIONS

Kim B. Bruce, "Some Challenging Typing Issues in Object-Oriented Languages Extended Abstract", Elsevier B. V. 2003, available via http://www.elsevier.nl/locate/entcs/volume82.html 29 pages.*
U.S. Appl. No. 11/193,574, filed Jul. 29, 2005, Meijer, et al.
U.S. Appl. No. 11/193,573, filed Jul. 29, 2005, Warren, et al.
U.S. Appl. No. 11/193,787, filed Jul. 29, 2005, Meijer, et al.
U.S. Appl. No. 11/019,335, filed Dec. 21, 2004, Sonkin, et al.
Vieira et al. "XVerter: Querying XML Data with OR-DBMS," AMD 2003, Nov. 7, 2003, 8 pages, New Orleans, Louisiana.
Bonifati et al. "Pushing Reactive Services to XML Repositories Using Active Rules," ACM 2001, May 1, 2001, 9 pages, Hong Kong.
Sundaresan et al. "Algorithms and Programming Models for Efficient Representation of XML for Internet Applications," ACM 2001, May 1, 2001, 10 pages, Hong Kong.
Abelson, et al., Structure and Interpretbn of Computer programs. The Rules of Evaluation [online], Cambridge, MA: The MIT Press. 1996 [retrieved on Jan. 30, 2007]. Retrieved from the Internet: CURL:http:llmitpress.mit.edu/sicp/full-text/sicp/book/node56.html>,(chapter 3.2.1).
Barcndrfgt, The Impact of the Lambda Calculus and Computer Science, The Bulletin of Symbolic Logic [online], Jun. 1997 [retrieved on Jan. 30, 2007] Retrieved from the Inlernet:<UPL;https://www.rncs.vuw.ac.nz/courses/COMP432/2006T2/docs/BarLarnbda.pdf>.
International Search Report dated Mar. 1, 2007 for PCT Application Serial No. PCT/US 06/24567, 2 Pages.
International Search Report dated Sep. 17, 2007 for PCT Application Serial No. PCT/US 06/24567, 3 Pages.
C#: Overview of C# 3.0, Draft 2, Jul. 2005, 18 pages.

* cited by examiner

ARCHITECTURE THAT EXTENDS TYPES USING EXTENSION METHODS

BACKGROUND

When creating frameworks programmers want extensibility in several dimensions; they want to add new types and they want to add new functionality. Traditional imperative languages and modern functional languages make it easy to add new functions (since functions are defined independently from types), but make it hard to add new types (since this would require dealing with this new type in all existing functions).

Object-oriented languages on the other hand, make it easy to add new types, but make hard to add new functions (since this would require adding new methods to all existing types). For constructed types (such as IEnumerable<string>) it is even impossible to add new methods, since there is no class declaration for that particular type to add these new methods. A typical example that requires both forms of extensibility is in compiler construction.

This extensibility dilemma is what is called "the expression problem". This fundamental dilemma of programming is the desire that an application can be structured in such a way that both the data model and the set of virtual operations over it be extended without the need to modify existing code, without the need for code repetition and without runtime type errors.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The invention disclosed and claimed herein, in one aspect thereof, comprises architecture for extending existing types using extension methods.

In another aspect, a mechanism is provided for adding extensions to constructed types.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
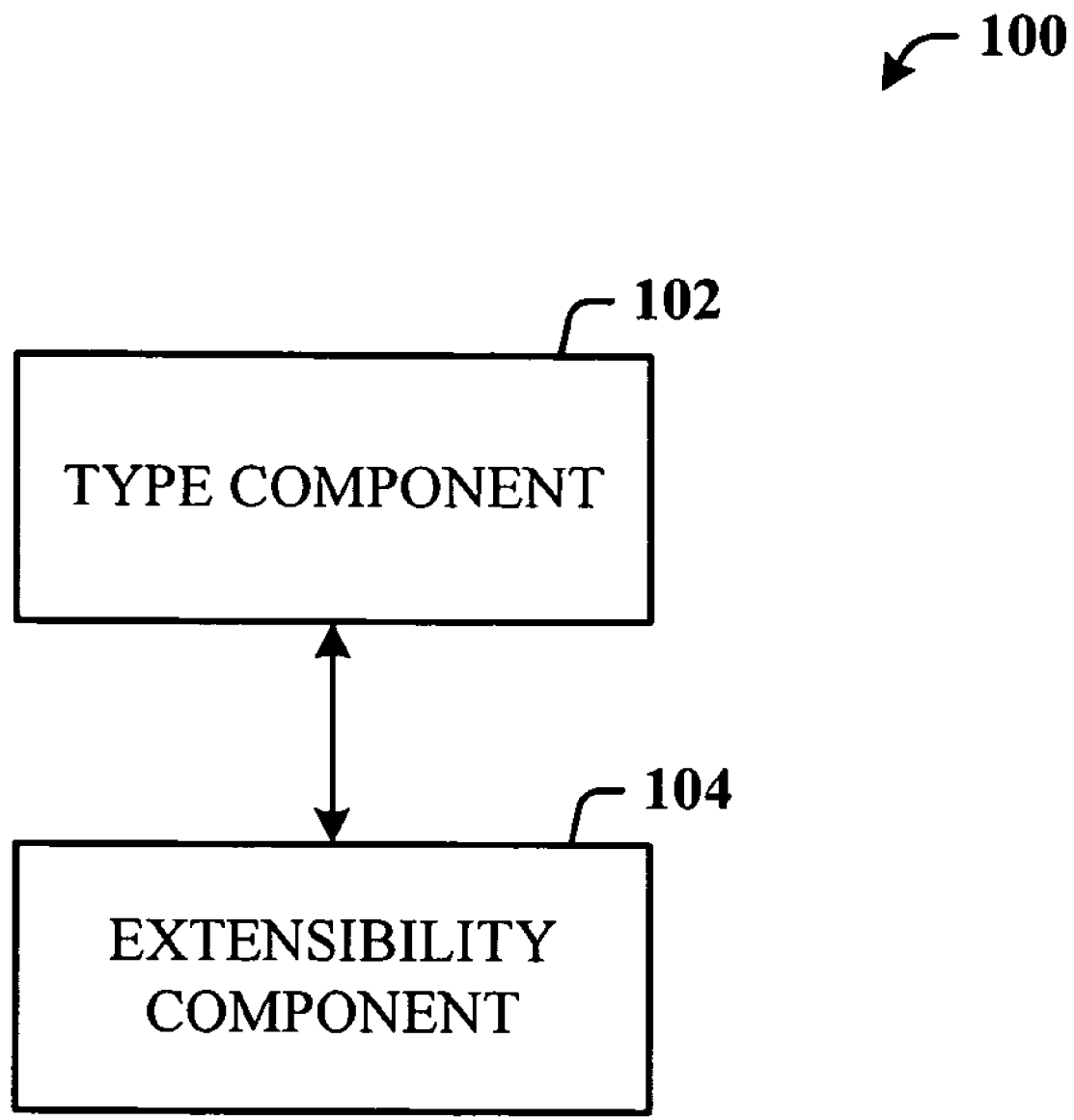
FIG. 1 illustrates a system that facilitates type extension in accordance with the subject innovation.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Referring initially to the drawings, FIG. 1 illustrates a system 100 that facilitates type extension in accordance with the subject innovation. The system 100 includes a type component 102 that provides a type (e.g., an existing type or a new type) and an extensibility component 104 that facilitates adding an extension methods to the type.

Figure 2:
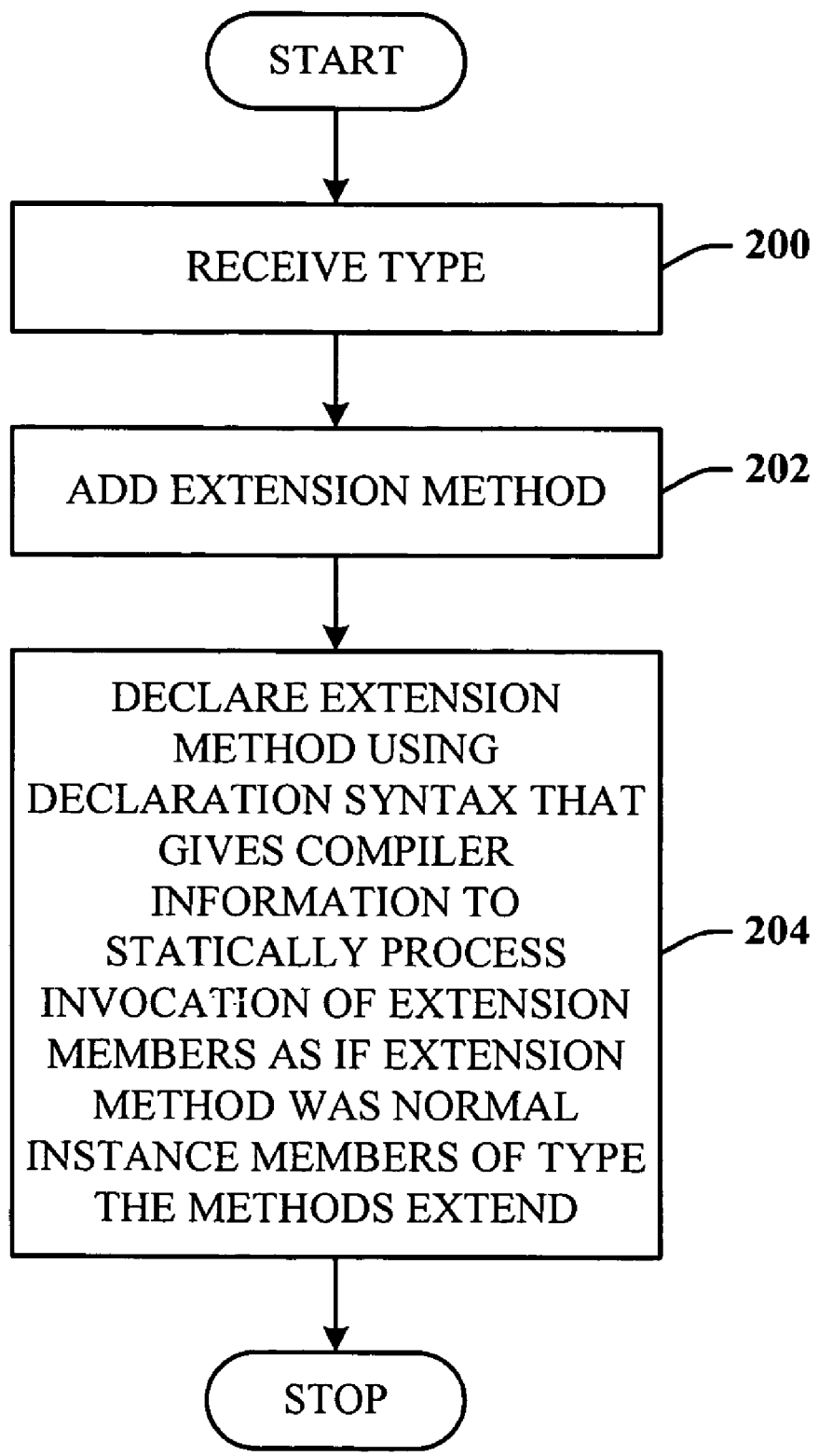
FIG. 2 illustrates a methodology of extending types in accordance with an innovative aspect.

FIG. 2 illustrates a methodology of extending types in accordance with an innovative aspect. While, for purposes of simplicity of explanation, the one or more methodologies shown herein, e.g., in the form of a flow chart or flow diagram, are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 200, a type (e.g., static type) is received for extension processing. At 202, an extension method is added to the type. At 204, the extension method is declared using declaration syntax that gives the compiler sufficient information to statically process the invocation of extension members using declaration syntax that treats the extension methods as if they were normal instance members of the type the methods extend.

Extension methods are static methods that can be invoked using instance method syntax. In effect, extension methods make it possible to extend existing types, sealed types, and constructed types with additional methods. Extension methods can be declared by specifying the keyword "this" as a modifier on the first parameter of the methods. Other keywords can be employed as custom attributes to declare the extension method. Extension methods are declared in static classes. The following is an example of a static class that declares two extension methods:

```
namespace Acme.Utilities
{
    public static class Extensions
    {
        public static int ToInt32(this string s) {
            return Int32.Parse(s);
        }
        public static T[ ] Slice<T>(this T[ ] source, int index, int count)
        {
            if (index < 0 || count < 0 || source.Length – index < count)
                throw new ArgumentException( );
            T[ ] result = new T[count];
            Array.Copy(source, index, result, 0, count);
            return result;
        }
    }
}
```

Note, however, that the subject invention is not limited to the above syntax. Additionally, extension methods can be added to any type, in particular, to constructed types. The above example added a new method to T[ ] for any type T, but an extension method can also be added to just IEnumerable<string>:

```
public static class MoreExtensions
{
    public static void Print(this IEnumerable<string> source) {
        foreach(string s in source) Console.WriteLine(s);
    }
}
```

Figure 3:
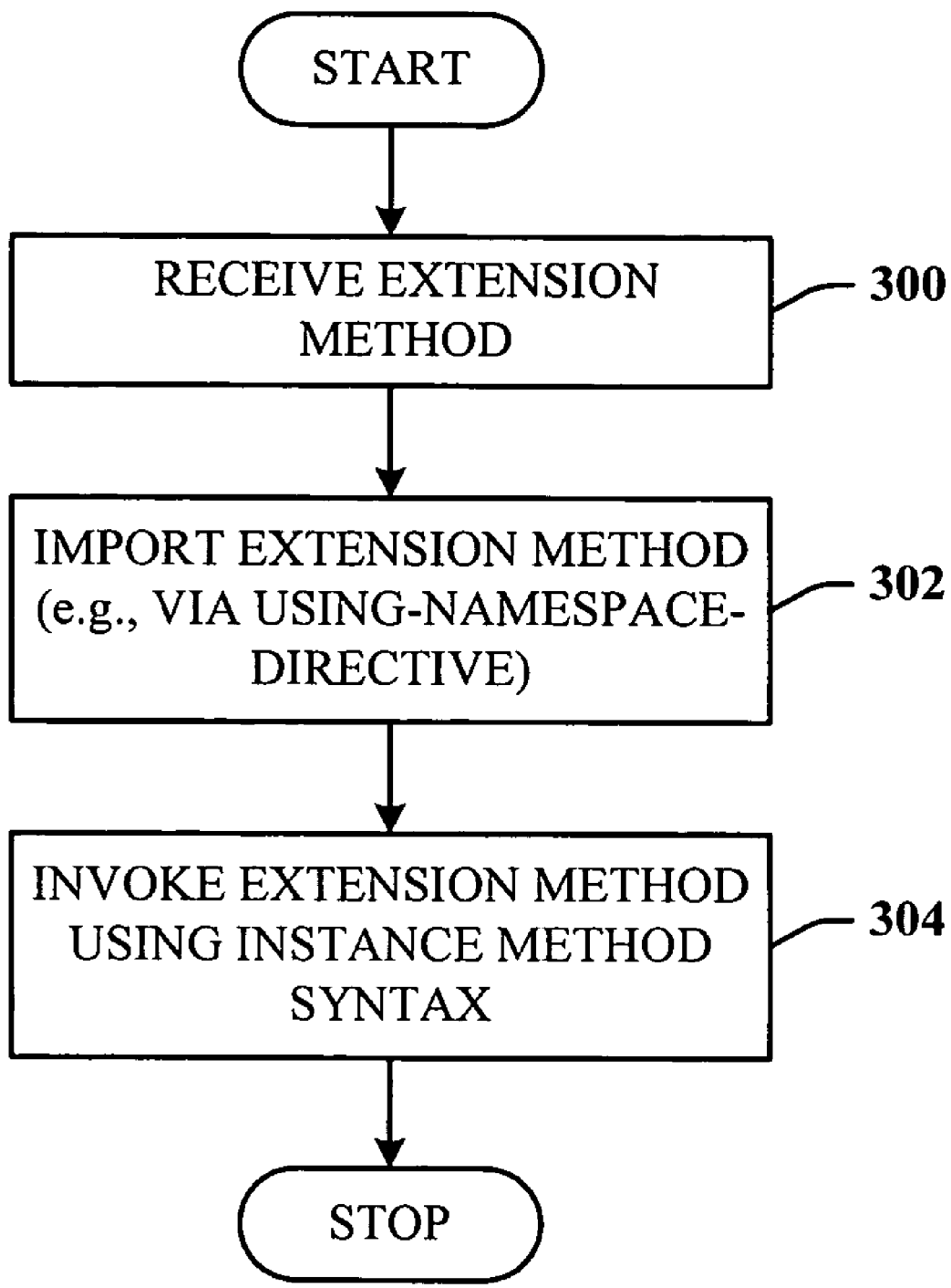
FIG. 3 illustrates a methodology of importing an extension method.

Extension methods have all the capabilities of regular static methods. In addition, once imported, extension methods can be invoked using instance method syntax. Accordingly, FIG. 3 illustrates a methodology of importing an extension method. At 300, an extension method if received for processing. At 302, the extension method is imported. Extension methods can be imported through a using-namespace-directive. In addition to importing the types contained in a namespace, a using-namespace-directive imports all extension methods in all static classes in the namespace. At 304, the imported extension method can be invoked using instance method syntax. Note that this is just one example for importing an extension method. Other general mechanisms for importing extension methods are also within contemplation of the subject invention.

In effect, imported extension methods appear as additional methods on the types that are given by their first parameter and have lower precedence than regular instance methods. For example, when the Acme.Utilities namespace from the example above is imported with the using-namespace-directive using Acme.Utilities; it becomes possible to invoke the extension methods in the static class Extensions using instance method syntax:

```
string s = "1234";
int i = s.ToInt32( );
int I = Extensions.ToInt32(s)
```

```
string[ ] text = { "the", "quick", "brown", "fox", "jumped", "over",
"the", "lazy", "dog" };
string[ ] fragment = text.Slice(2, 4) // {"brown", "fox", "jumped",
"over" }
string[ ] fragment = Extensions.Slice(text, 2, 4) // {"brown", "fox",
"jumped", "over" }
```

Figure 4:
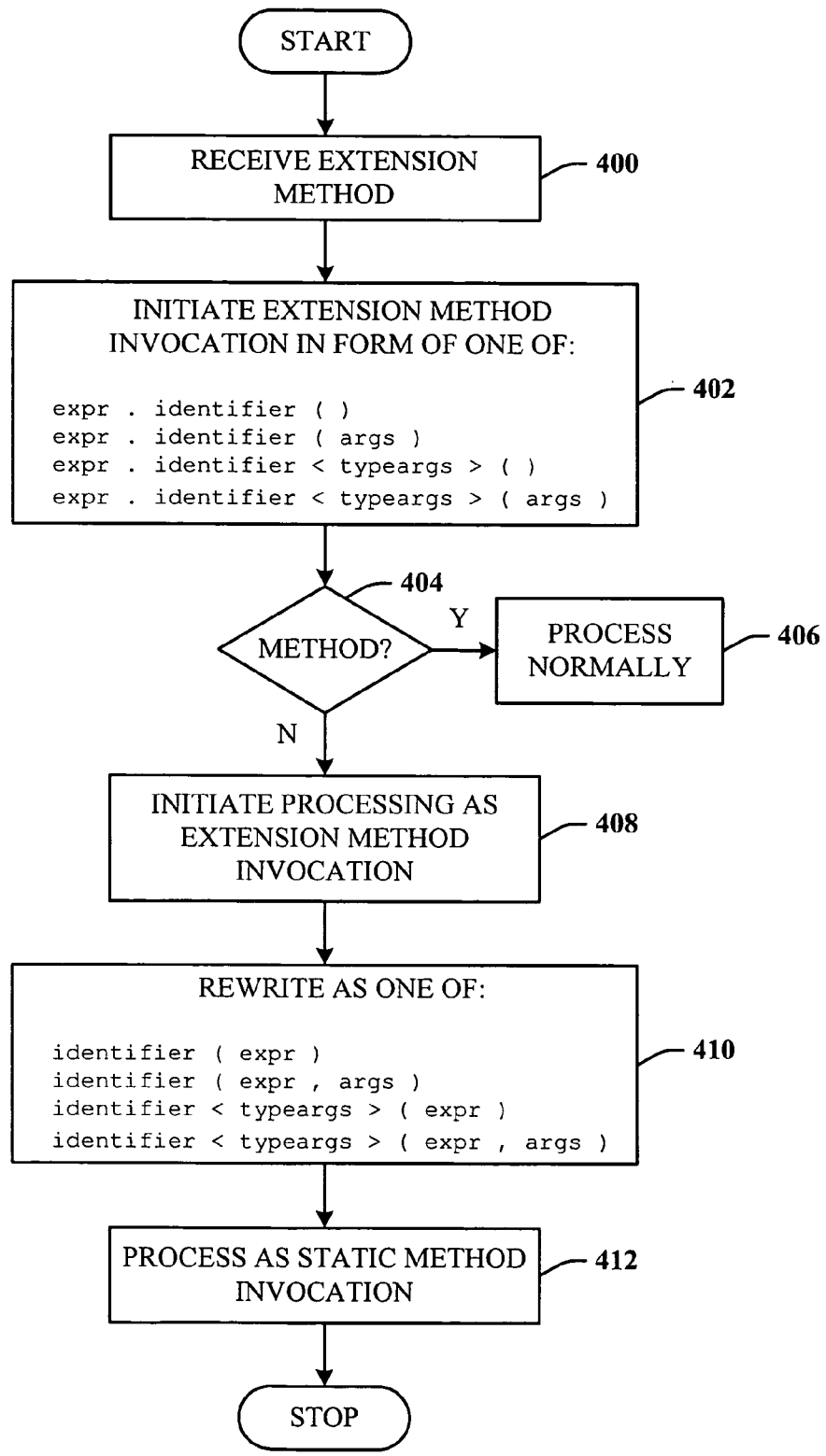
FIG. 4 illustrates a methodology of invoking an extension method.

FIG. 4 illustrates a methodology of invoking an extension method. At 400, an extension method is received for processing. At 402, extension method invocation is initiated in one of the following forms:

```
expr . identifier ( )
expr . identifier ( args )
expr . identifier < typeargs > ( )
expr . identifier < typeargs > ( args )
```

At 404, the system checks if the normal processing of the invocation finds no applicable instance methods (specifically, if the set of candidate methods for the invocation is empty). If yes, flow is to 406 for normal processing. Alternatively, if no, flow progresses to 408, to initiate processing of the construct as an extension method invocation. At 410, the method invocation is first rewritten to one of the following, respectively:

```
identifier ( expr )
identifier ( expr , args )
identifier < typeargs > ( expr )
identifier < typeargs > ( expr , args )
```

Figure 5:
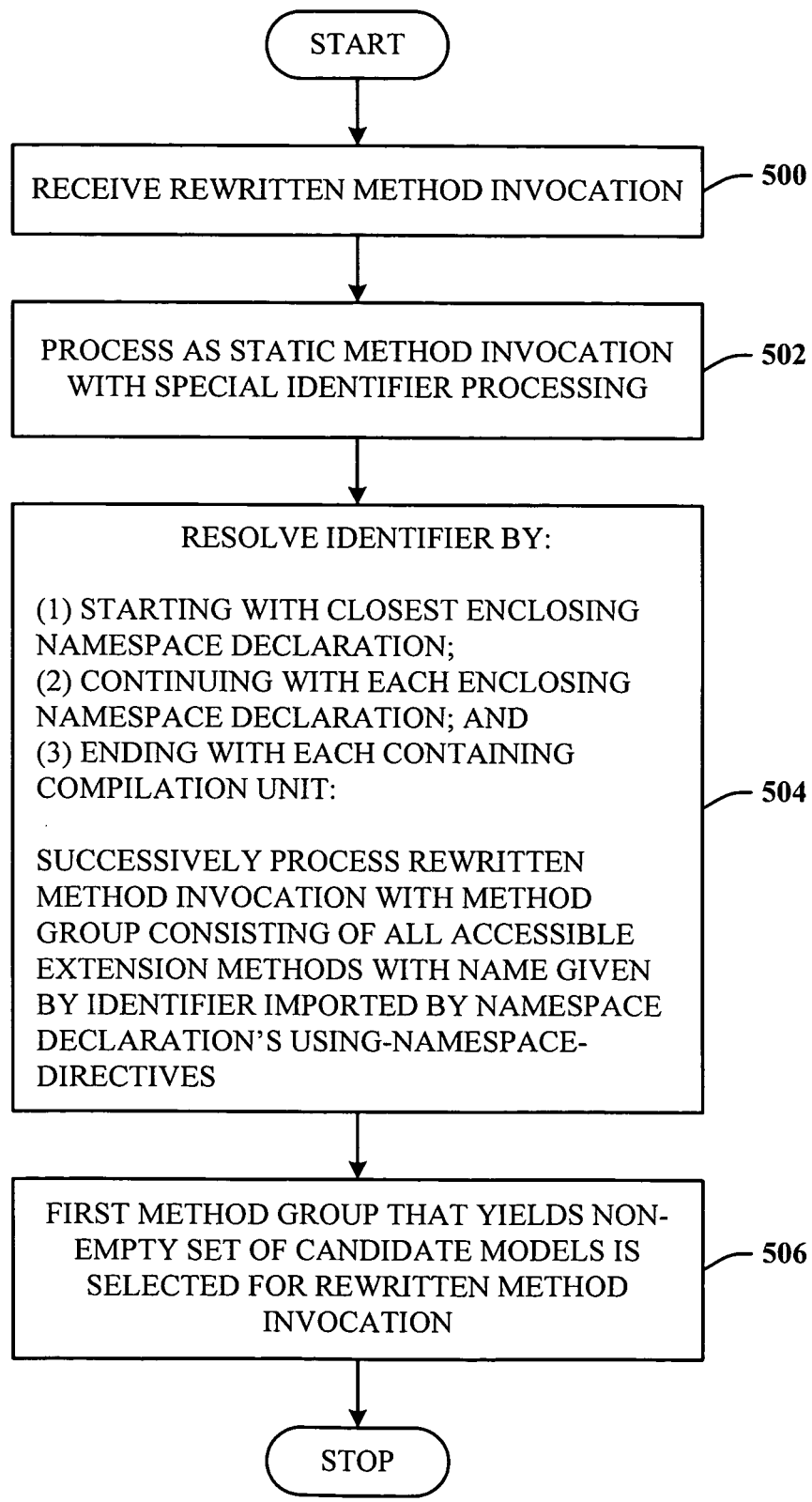
FIG. 5 illustrates a methodology of resolving the identifier.

At 412, the rewritten form is then processed as a static method invocation, except for the way in which identifier is resolved. FIG. 5 illustrates a methodology of resolving the identifier. At 500, a rewritten method invocation is received for processing. At 502, the rewritten method invocation is processed as a static method invocation with special identifier processing. At 504, starting with the closest enclosing namespace declaration, continuing with each enclosing namespace declaration, and ending with the containing compilation unit, successive attempts are made to process the rewritten method invocation with a method group consisting of all accessible extension methods with the name given by identifier imported by the namespace declaration's using-namespace-directives. At 506, the first method group that yields a non-empty set of candidate methods is the one chosen for the rewritten method invocation. If all attempts yield empty sets of candidate methods, a compile-time error occurs.

Not that the above process is one example of how a compiler can statically determine which extension method needs to be invoked given a normal method invocation. It is a special case of a general mechanism to statically determine which extension method to invoke given any form of ordinary member access.

Figure 6:
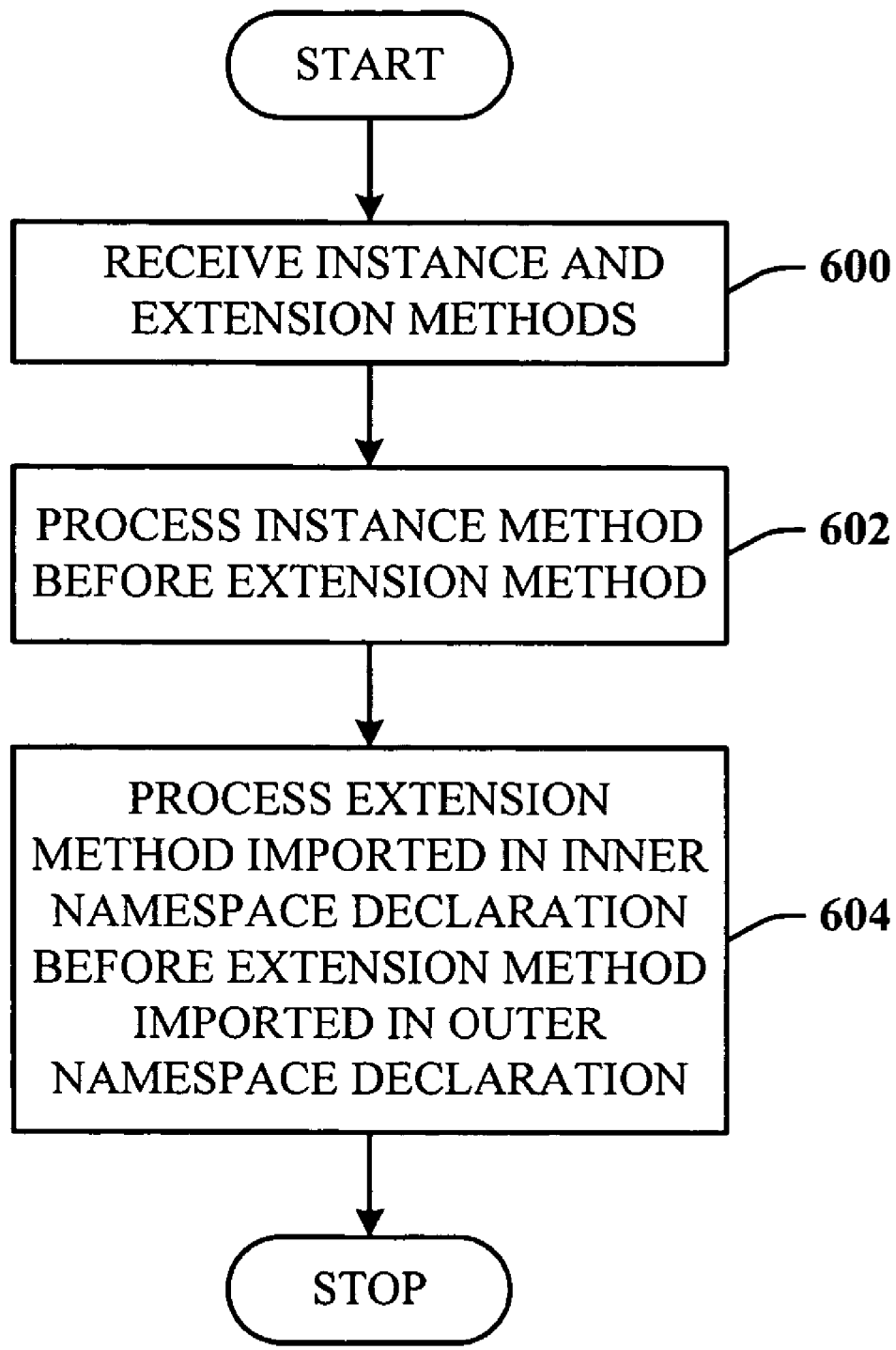
FIG. 6 illustrates a methodology of processing methods in accordance with an innovative aspect.

FIG. 6 illustrates a methodology of processing methods in accordance with an innovative aspect. At 600, instance and extension methods are received for processing. At 602, the instance method takes processing precedence over extension methods. At 604, extension methods imported in inner namespace declarations take precedence over extension methods imported in outer namespace declarations. For example:

```
using N1;
namespace N1
{
    public static class E
    {
        public static void F(this object obj, int i) { }
        public static void F(this object obj, string s) { }
    }
}
class A { }
class B
{
    public void F(int i) { }
}
class C
{
    public void F(object obj) { }
}
class X
{
    static void Test(A a, B b, C c) {
        a.F(1);         // E.F(object, int)
        a.F("hello");   // E.F(object, string)
        b.F(1);         // B.F(int)
        b.F("hello");   // E.F(object, string)
        c.F(1);         // C.F(object)
        c.F("hello");   // C.F(object)
    }
}
```

In the above example, B's method takes precedence over the first extension method, and C's method takes precedence over both extension methods.

Figure 7:
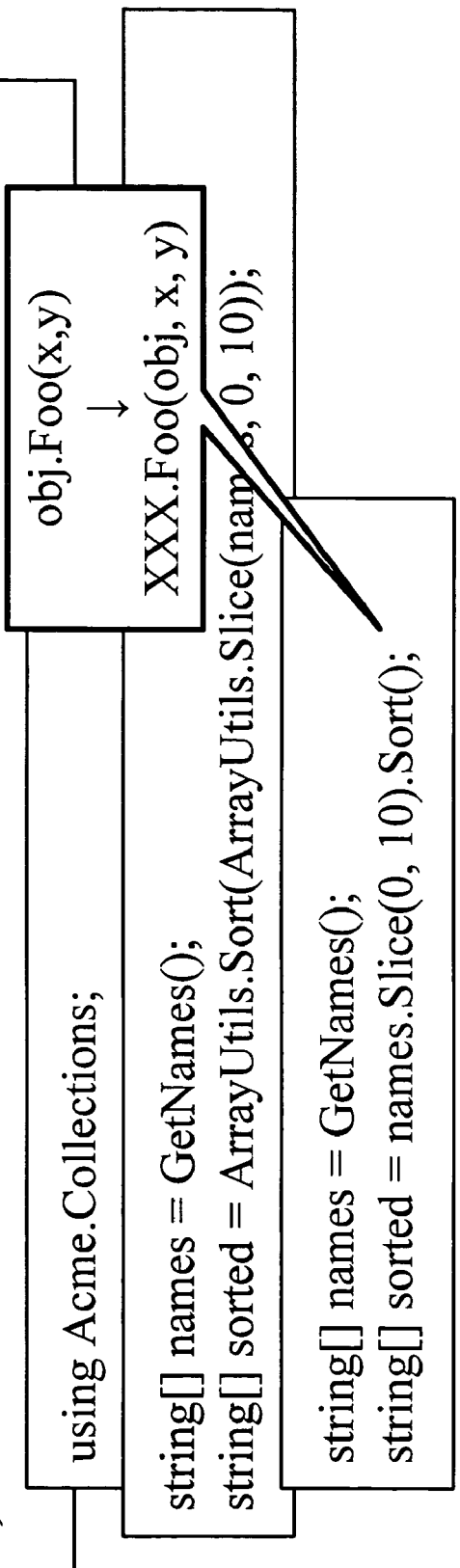
FIG. 7 illustrates sample code for extending existing types with extension methods.

FIG. 7 illustrates sample code for extending existing types with extension methods.

Figure 8:
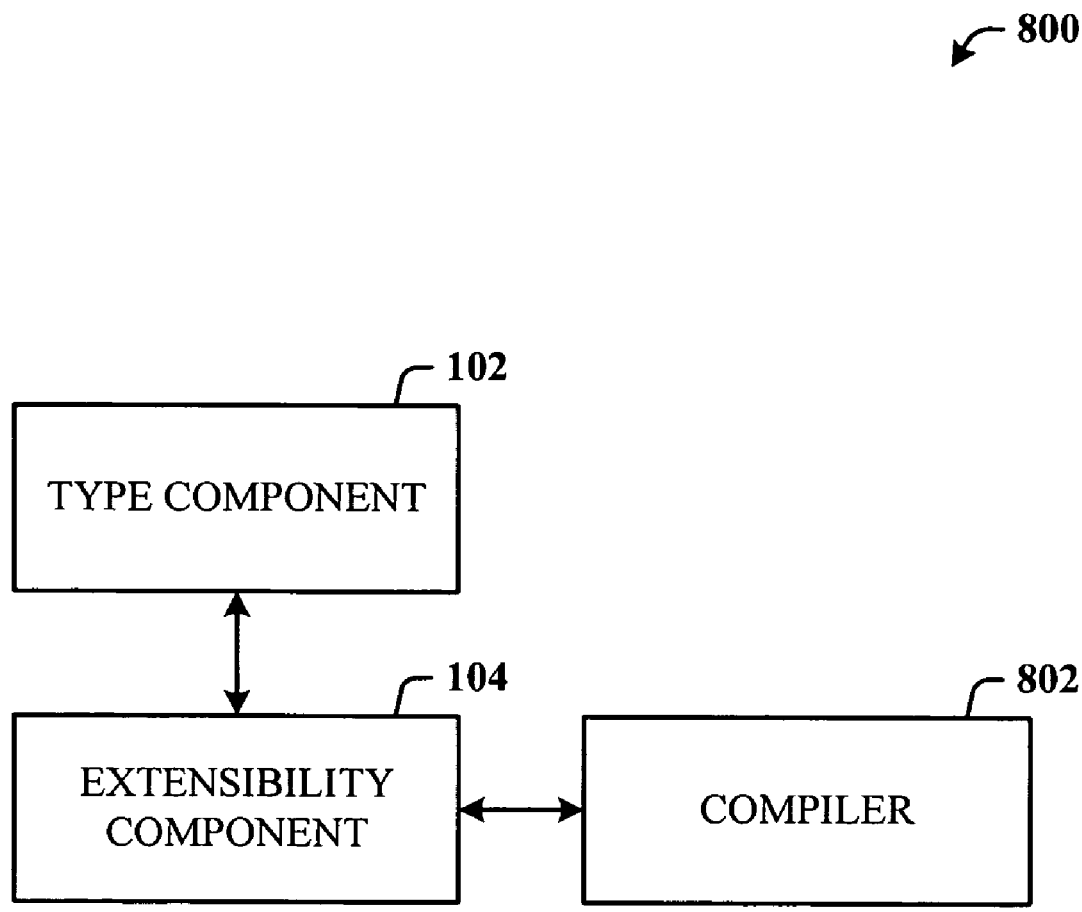
FIG. 8 illustrates a system that employs a compiler to process extension methods in accordance with the disclosed innovation.

FIG. 8 illustrates a system 800 that employs a compiler 802 to process extension methods in accordance with the disclosed innovation. The system 800 employs the type component 102 and extensibility component 104 of FIG. 1. In this implementation, the compiler 802 interfaces to the extensibility component 104 to receive the type and one or more extension methods for processing. It is to be appreciated that the compiler 802 can interface directly to the type component 102 rather than the extensibility component 104 to receive the extended type for processing.

Figure 9:
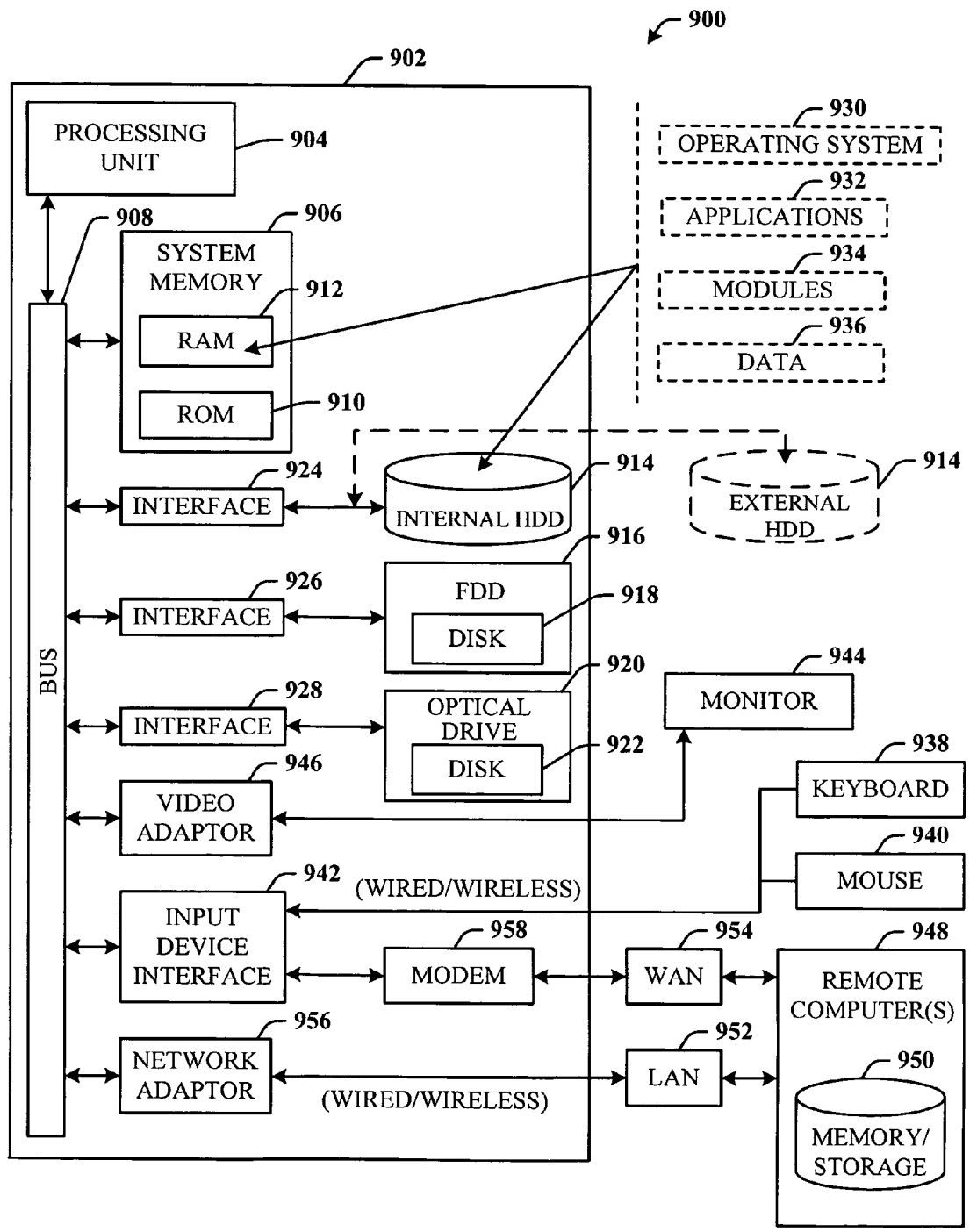
FIG. 9 illustrates a block diagram of a computer operable to execute the disclosed architecture.

Referring now to FIG. 9, there is illustrated a block diagram of a computer operable to execute the disclosed architecture. In order to provide additional context for various aspects thereof, FIG. 9 and the following discussion are intended to provide a brief, general description of a suitable computing environment 900 in which the various aspects of the innovation can be implemented. While the description above is in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, micro-processor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 9, the exemplary environment 900 for implementing various aspects includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures may also be employed as the processing unit 904.

The system bus 908 can be any of several types of bus structure that may further interconnect to a memory bus (with or without a memory controller), a peripheral bus, and a local bus using any of a variety of commercially available bus architectures. The system memory 906 includes read-only memory (ROM) 910 and random access memory (RAM) 912. A basic input/output system (BIOS) is stored in a non-volatile memory 910 such as ROM, EPROM, EEPROM, which BIOS contains the basic routines that help to transfer information between elements within the computer 902, such as during start-up. The RAM 912 can also include a high-speed RAM such as static RAM for caching data.

The computer 902 further includes an internal hard disk drive (HDD) 914 (e.g., EIDE, SATA), which internal hard disk drive 914 may also be configured for external use in a suitable chassis (not shown), a magnetic floppy disk drive (FDD) 916, (e.g., to read from or write to a removable diskette

918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 902, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed innovation.

A number of program modules can be stored in the drives and RAM 912, including an operating system 930, one or more application programs 932, other program modules 934 and program data 936. All or portions of the operating system, applications, modules, and/or data can also be cached in the RAM 912. It is to be appreciated that the innovation can be implemented with various commercially available operating systems or combinations of operating systems.

A user can enter commands and information into the computer 902 through one or more wired/wireless input devices, e.g., a keyboard 938 and a pointing device, such as a mouse 940. Other input devices (not shown) may include a microphone, an IR remote control, a joystick, a game pad, a stylus pen, touch screen, or the like. These and other input devices are often connected to the processing unit 904 through an input device interface 942 that is coupled to the system bus 908, but can be connected by other interfaces, such as a parallel port, an IEEE 1394 serial port, a game port, a USB port, an IR interface, etc.

A monitor 944 or other type of display device is also connected to the system bus 908 via an interface, such as a video adapter 946. In addition to the monitor 944, a computer typically includes other peripheral output devices (not shown), such as speakers, printers, etc.

The computer 902 may operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN) 954. Such LAN and WAN networking environments are commonplace in offices and companies, and facilitate enterprise-wide computer networks, such as intranets, all of which may connect to a global communications network, e.g., the Internet.

When used in a LAN networking environment, the computer 902 is connected to the local network 952 through a wired and/or wireless communication network interface or adapter 956. The adaptor 956 may facilitate wired or wireless communication to the LAN 952, which may also include a wireless access point disposed thereon for communicating with the wireless adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wired or wireless device, is connected to the system bus 908 via the serial port interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 10:
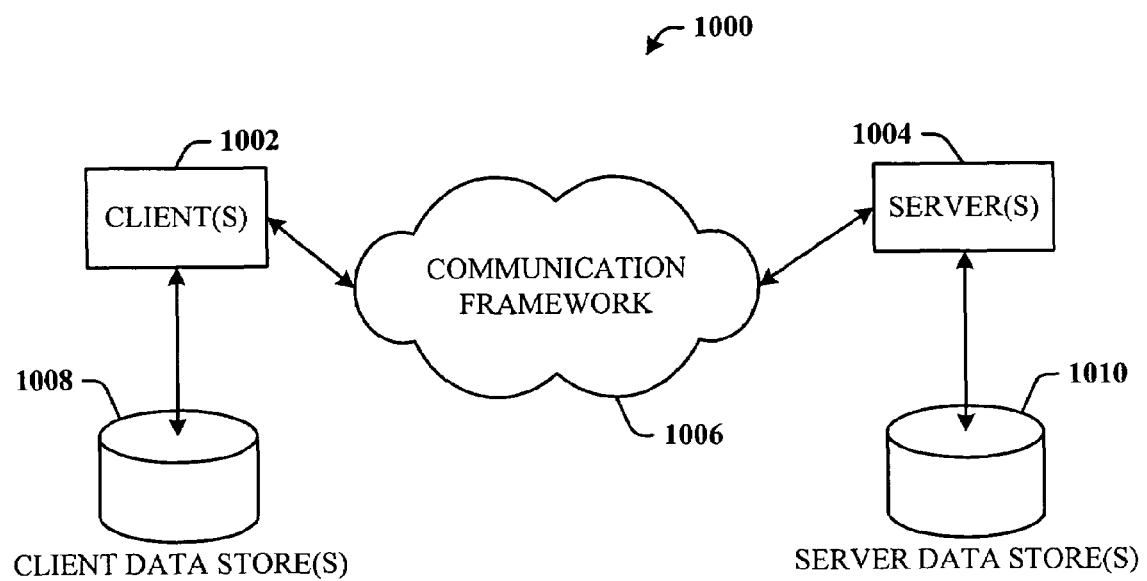
FIG. 10 illustrates a schematic block diagram of an exemplary computing environment.

Referring now to FIG. 10, there is illustrated a schematic block diagram of an exemplary computing environment 1000 in accordance with another aspect. The system 1000 includes one or more client(s) 1002. The client(s) 1002 can be hardware and/or software (e.g., threads, processes, computing devices). The client(s) 1002 can house cookie(s) and/or associated contextual information by employing the subject innovation, for example.

The system 1000 also includes one or more server(s) 1004. The server(s) 1004 can also be hardware and/or software (e.g., threads, processes, computing devices). The servers 1004 can house threads to perform transformations by employing the invention, for example. One possible communication between a client 1002 and a server 1004 can be in the form of a data packet adapted to be transmitted between two or more computer processes. The data packet may include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

What has been described above includes examples of the disclosed innovation. It is, of course, not possible to describe every conceivable combination of components and/or methodologies, but one of ordinary skill in the art may recognize that many further combinations and permutations are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of extending data model and operations without needing to modify existing codes, the method comprising:

receiving a static type for extension processing;

extending the type by adding an extension method to the static type, wherein the extension method is declared using declaration syntax providing a compiler with sufficient information to statically process invocation of the extension method;

statically processing invocation of the extension method by treating the extension method as a normal instance method of the type the extension method extends rather than as a method having declaration syntax;

determining whether normal processing of invocation includes any applicable instance methods;

when there are no applicable instance methods, proceeding to normal processing; and when there are applicable instance methods:

rewriting the applicable instance methods with identifiers followed by a parenthetical containing at least one expression; and processing the rewritten applicable instance methods as a static method invocation, except for resolving of the identifier, which has special identifier processing, the special identifier processing includes namespace processing that begins with a closest namespace declaration and successively processes the rewritten applicable instance methods using a method group that includes all accessible extension methods having a name given by the identifier.

2. The method of claim 1, further comprising an act of importing the extension method.

3. The method of claim 2, further comprising an act of invoking the extension method using instance method syntax.

4. The method of claim 1, further comprising an act of processing an instance method before an extension method.

5. The method of claim 1, further comprising an act of processing an extension method imported in an inner namespace declaration before an extension method imported in an outer namespace declaration.

6. The method of claim 1, further comprising an act of declaring an extension method, which is an extension method, by a "this" keyword.

7. The method of claim 1, further comprising an act of processing a rewritten method invocation based on an act of resolving an identifier.

8. The method of claim 1, wherein the extension member is declared in an extension class which declares a plurality of extension methods.

9. A computer-readable medium having stored thereon computer-executable instructions that, when executed by a computing system, perform a method of extending data model and operations without needing to modify existing codes, the method comprising:

receiving a static type for extension processing;

extending the type by adding an extension method to the static type, wherein the extension method is declared using declaration syntax providing a compiler with sufficient information to statically process invocation of the extension method; and statically processing invocation of the extension method by treating the extension method as a normal instance method of the type the extension method extends rather than as a method having declaration syntax;

determining whether normal processing of invocation includes any applicable instance methods;

when there are no applicable instance methods, proceeding to normal processing; and when there are applicable instance methods:

rewriting the applicable instance methods with identifiers followed by a parenthetical containing at least one expression; and processing the rewritten applicable instance methods as a static method invocation, except for resolving of the identifier, which has special identifier processing, the special identifier processing includes namespace processing that begins with a closest namespace declaration and successively processes the rewritten applicable instance methods using a method group that includes all accessible extension methods having a name given by the identifier.

10. The computer-readable medium of claim 9, wherein the method further comprises importing the extension method.

11. The computer-readable medium of claim 10, wherein the method further comprises invoking the extension method using instance method syntax.

12. The computer-readable medium of claim 9, wherein the method further comprises processing an instance method before an extension method.

13. The computer-readable medium of claim 9, wherein the method further comprises processing an extension method imported in an inner namespace declaration before an extension method imported in an outer namespace declaration.

14. The computer-readable medium of claim 9, wherein the method further comprises declaring an extension method, which is an extension method, by a "this" keyword.

15. The computer-readable medium of claim 9, wherein the method further comprises processing a rewritten method invocation based on an act of resolving an identifier.

16. The computer-readable medium of claim 9, wherein the extension member is declared in an extension class which declares a plurality of extension methods.

17. A computer-implemented method for extending data model and virtual operations without the need to modify existing code, the method comprising:

receiving a static type for extension processing;

receiving an extension method, the extension method corresponding to a namespace, wherein the received extension method is declared in a static class and using a "this" modifier on a first parameter within a parenthetical of the extension method;

importing the extension method through a using-namespace-directive, wherein the using-namespace-directive imports all extension methods in all static classes in the namespace, and wherein the imported extension method is given a lower precedence than a regular instance method;

extending the type by adding an extension method to the static type, wherein the extension method is declared using declaration syntax providing sufficient information to statically process invocation of the extension method;

invoking the imported extension method, wherein invoking the imported extension method is performed using instance method syntax rather than declaration syntax;

checking to determine whether normal processing of invocation includes any applicable instance methods;

when there are no applicable instance methods, proceeding to normal processing; and when there are applicable instance methods:

rewriting the applicable instance methods with identifiers followed by a parenthetical containing at least one expression; and processing the rewritten applicable instance methods as a static method invocation, except for resolving of the identifier, which has special identifier processing, the special identifier processing includes namespace processing that begins with a closest namespace declaration and successively processes the rewritten applicable instance methods using a method group that includes all accessible extension methods having a name given by the identifier.

* * * * *